United States Patent
Mitsunaga et al.

(10) Patent No.: US 6,389,439 B1
(45) Date of Patent: May 14, 2002

(54) RANDOM-NUMBER GENERATING METHOD AND APPARATUS AND STORAGE MEDIUM THEREFOR

(75) Inventors: Saori Mitsunaga, Kawasaki; Nobuhiro Ioki, Ebina, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/353,146

(22) Filed: Jul. 14, 1999

(30) Foreign Application Priority Data

Jul. 14, 1998 (JP) .......................................... 10-199022

(51) Int. Cl.$^7$ ................................................. G06F 1/02
(52) U.S. Cl. ....................................... 708/250; 708/256
(58) Field of Search .................................. 708/250–256

(56) References Cited

U.S. PATENT DOCUMENTS

| | | | | |
|---|---|---|---|---|
| 4,944,009 A | * | 7/1990 | Micali et al. ................ | 708/250 |
| 5,327,365 A | * | 7/1994 | Fujisaki et al. ............. | 708/250 |
| 5,793,657 A | | 8/1998 | Nemoto | |
| 5,872,725 A | * | 2/1999 | Ninomiya et al. .......... | 708/250 |
| 5,983,252 A | * | 11/1999 | Clapp .......................... | 708/250 |
| 6,192,385 B1 | * | 2/2001 | Shimada ..................... | 708/250 |

FOREIGN PATENT DOCUMENTS

| | | |
|---|---|---|
| EP | 0529512 | 3/1993 |
| JP | 8339294 | 12/1996 |

OTHER PUBLICATIONS

M. Hennecke, "Parallelisierung von Zufallazahlen–Generatoren", March 1994, pp. 143–149.

* cited by examiner

*Primary Examiner*—Tan V. Mai
(74) *Attorney, Agent, or Firm*—Antonelli, Terry, Stout & Kraus, LLP

(57) ABSTRACT

A different phase type is specified toward each of a plurality of processors constituting a parallel computer, thereby, in a changeable manner, generating M sequence random numbers having the phase type. An information inputting unit inputs, into a random-number generating process unit, the number of the processors used in a parallel processing, the number of the random numbers to be generated by a single processor, the number of the phase types of the random numbers to be generated, and phase type information for each processor. The random-number generating process unit includes a phase-type management-table creating process unit, an initial-value table generating process unit, and a random-number generating calculation unit. Based on the number of the phase types of the random numbers to be generated and the phase type information for each processor, the phase type management table-creating process unit creates a phase type management table that manages which phase type of random numbers each of the processors generates. The initial-value table generating process unit creates an initial value table that generates the random numbers from the information stored in the phase type management table. The random-number generating calculation unit generates the random numbers from the created initial value table in accordance with a generation rule of the M sequence random numbers. An information outputting unit outputs random numbers that correspond to a phase type specified by the phase type information for each processor.

15 Claims, 12 Drawing Sheets

RANDOM-NUMBER GENERATING METHOD AND APPARATUS AND STORAGE MEDIUM THEREFOR

BACKGROUND OF THE INVENTION

The present invention relates to a random-number generating method and an apparatus and a storage medium therefor. More particularly, it relates to a random-number generating method and an apparatus and a storage medium therefor that, on a parallel computer having a plurality of processors, make it possible to generate M sequence (maximum-length linearly recurring sequence) random numbers having a plurality of phase types.

As conventional techniques concerning random-number generating systems, there have been known techniques disclosed in literatures such as "Random Numbers" by Masanori Fushimi (Tokyo University Press) and JP-A-6-202856. The former conventional technique relates to a theory about a system in which, in order for each of processors on a parallel computer to generate independent M sequence random numbers, the respective processors generate the M sequence random numbers having a different phase type. Also, the latter conventional technique relates to a system in which initial values are distributed so that a certain processor on the parallel computer can generate random numbers that are independent of random numbers generated by the other processors, thereby allowing the respective processors to independently generate the random numbers and making it possible to perform high rate generation of the random numbers.

The random-number generating systems according to the above-described two conventional techniques allow the respective processors on the parallel computer to generate the independent random numbers by independent processings, respectively, thus making it possible to perform the high rate generation processing of the random numbers with no communication overhead. In these conventional techniques, however, there exists no member of specifying which processor generates which phase type of random numbers. This condition necessarily results in a fact that, if the processor number is determined, the type of generated random numbers will be determined uniquely.

Generally speaking, in processing a numerical simulation in which, with random numbers being generated, the execution is performed by using the random numbers, there has been known the following: If, during the parallel execution, the solution is found to be invalid on a specific processor, it is effective in verifying the validity to perform a re-execution of the simulation by providing random numbers generated on another processor onto the processor on which the solution is found to be invalid. What is needed for the re-execution is that it is obvious which processor is generating which phase type of random numbers.

In the random-number generating systems according to the above-described conventional techniques, there exists no member of specifying which processor generates which phase type of random numbers. Moreover, there exists no member of exchanging generated random numbers between the processors such as, for example, generating, on a processor of logical processor number 7, random numbers that have been generated on a processor of logical processor number 0 up to now. On account of these features, the systems have a problem that they are unsuitable for being applied to the generation of random numbers in the parallel computer executing the numerical simulation as described above.

SUMMARY OF THE INVENTION

It is an object of the present invention to provide a random-number generating method and an apparatus and a storage medium therefor that specify a different phase type to each of a plurality of processors constituting a parallel computer so as to generate M sequence random numbers having the phase type. It is another object of the present invention to provide a random-number generating method and an apparatus and a storage medium therefor that make it possible to change a phase type of the random numbers that each processor is caused to generate.

In a random-number generating method in which a parallel computer having a plurality of processors is used so as to generate random numbers having a plurality of phase types, the above-described objects are accomplished in the following manner: Any one of the processors manages processors generating the random numbers and phase types used for generating the random numbers by the processors generating the random numbers in such a manner that the processors and the phase types are in correspondence with each other, and the processors generating the random numbers generate the random numbers of the phase types being in correspondence therewith. Moreover, the above-described objects are accomplished in the following manner: A first processor manages second and third processors and phase types used for generating the random numbers by the second and third processors in such a manner that the processors and the phase types are in correspondence with each other, and the second and third processors generate the random numbers of the phase types being in correspondence therewith. Also, in a random-number generating method in which a parallel computer having a plurality of processors is used so as to generate random numbers having a plurality of phase types, the above-described objects are accomplished in the following manner: Two pieces of information, i.e. the number of phase types of random numbers to be generated and information specifying which phase type of random numbers each of the processors generates, are inputted, and the processors generate random numbers of the phase types specified out of the phase types by the number of the phase types. Moreover, the above-described objects are accomplished in the following manner: The processors, receiving the inputted information, create a management table that manages the processors and the phase types of random numbers to be generated in such a manner that the processors and the phase types are in correspondence with each other, and the processors generate random numbers of phase types specified based on the management table. Furthermore, the above-described objects are accomplished in the following manner: A first processor, receiving the inputted information, creates the management table, and a second processor generates random numbers of phase types specified based on the created management table. In addition, the above-described objects are accomplished by creating the management table that manages the plurality of processors in such a manner that the processors are in correspondence with the phase types of random numbers that are different from each other. In addition, the above-described objects are accomplished in the following manner: Each of the processors creates initial value tables by the number of the phase types, and, out of the created initial value tables, selects an initial value table for generating the random numbers of the phase types specified based on the management table, and generates random numbers of phase types specified based on the selected initial value table. In addition, the above-described objects are accomplished in the following manner: Each of the processors generates, at a plurality of times, random numbers of one phase type specified based on the selected initial value table. In addition, the above-described objects are accomplished by changing the correspondence relation between the processors managed by the management table and the phase types of the random numbers to be generated and exchanging, between the processors, the phase types of the random numbers to be generated. Also, in a random-number generating method in which a parallel computer having a plurality of processors is used so as to generate random numbers having a plurality of phase types, the above-described objects are accomplished in the following manner: Two pieces of information, i.e. the number of the processors used and information specifying which phase type of random numbers each of the processors generates, are inputted. Then, the processors, from the number of the processors used, determine the number of phase types of random numbers to be generated and generate random numbers of the phase types specified out of the phase types by the number of the phase types. Also, in a random-number generating apparatus that includes a plurality of processors and generates random numbers having a plurality of phase types, the above-described objects are accomplished in the following manner: The processors include a management member that manages the processors and the phase types of the random numbers to be generated in such a manner that the processors and the phase types are in correspondence with each other, and include a random-number calculating member that receives information from the management member so as to calculate the random numbers of the phase types being in correspondence the processors. Moreover, the above-described objects are accomplished in the following manner: A first processor includes the management member, and a second processor includes the random-number calculating member. Furthermore, the above-described objects are accomplished in the following manner: The processors include a changing member of changing the correspondence relation between the processors and the phase types of the random numbers to be generated. In addition, the above-described objects are accomplished in the following manner: The management member manages the plurality of processors in such a manner that the processors are in correspondence with the phase types of random numbers that are different from each other. Incidentally, the above-described objects can also be accomplished by using a storage medium that stores a random-number generating program capable of executing the functions embodied by the above-described method and apparatus.

DETAILED DESCRIPTION OF THE EMBODIMENTS

Using the accompanying drawings, the detailed explanation will be given hereinafter concerning an embodiment of a random-number generating system according the present invention.

Figure 1:
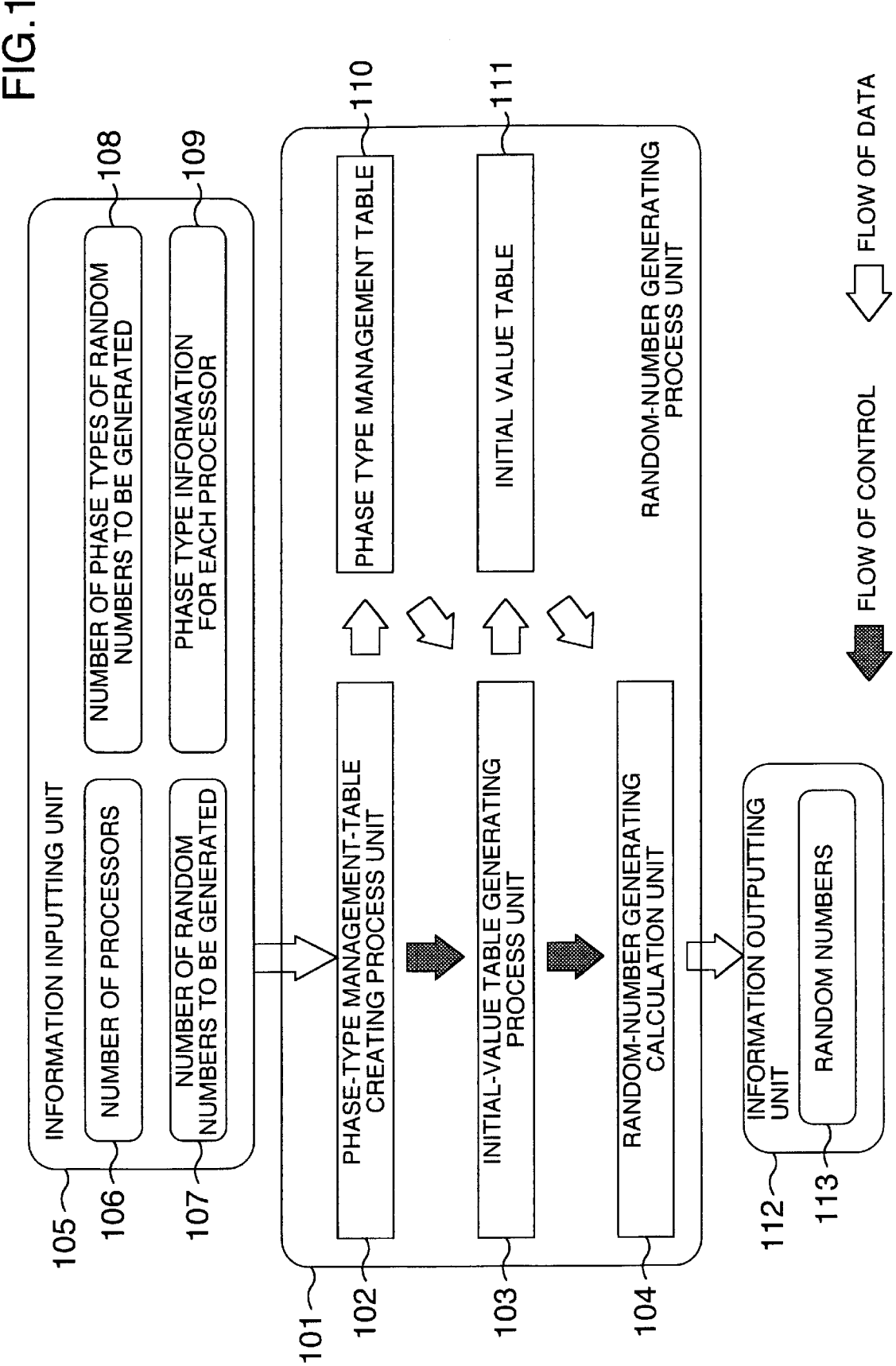
FIG. 1 is a diagram explaining processes in a random-number generating system according to an embodiment of the present invention.
Figure 2:
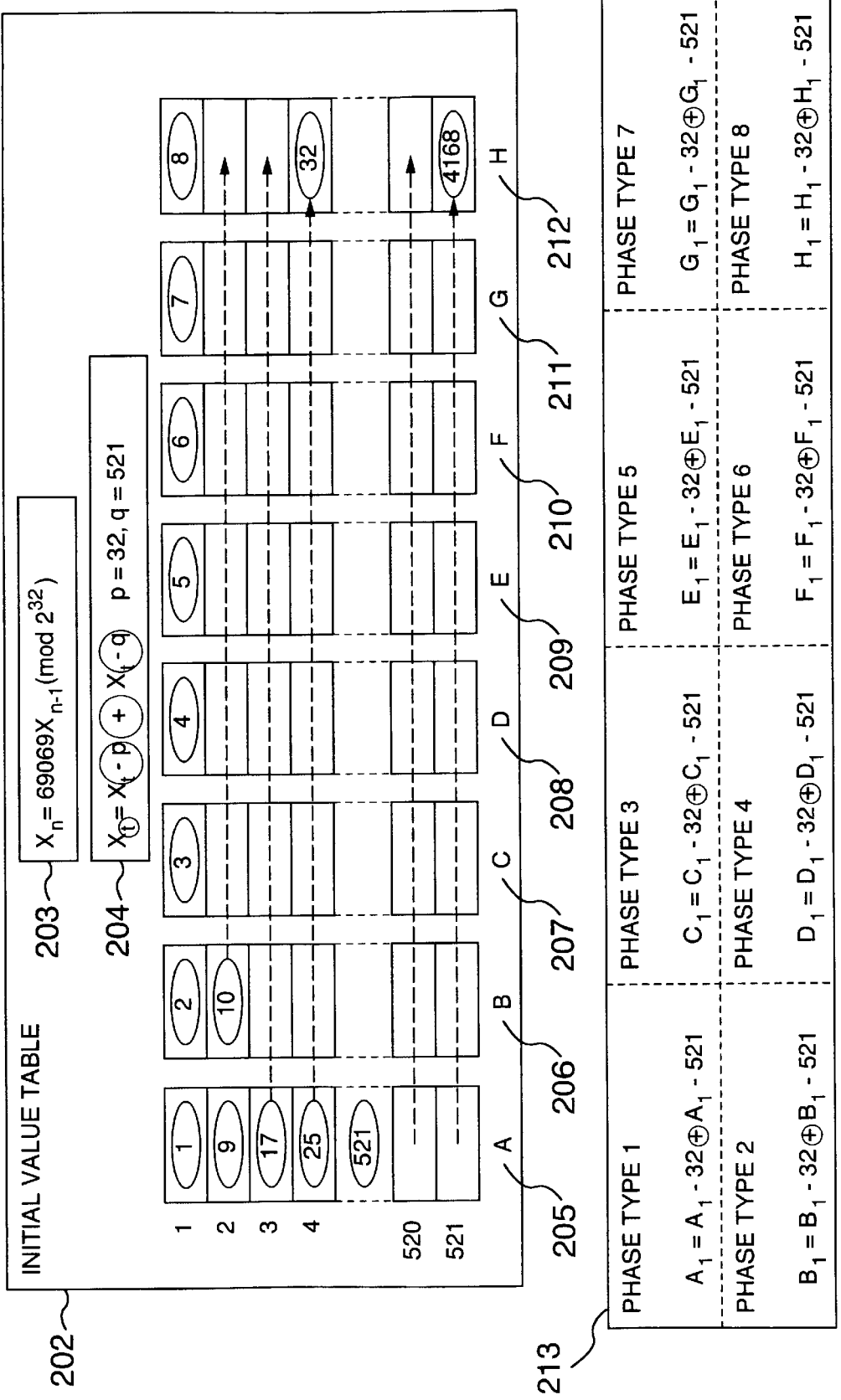
FIG. 2 is a diagram explaining processing steps of generating maximum-length linearly recurring sequence random numbers.
Figure 3:
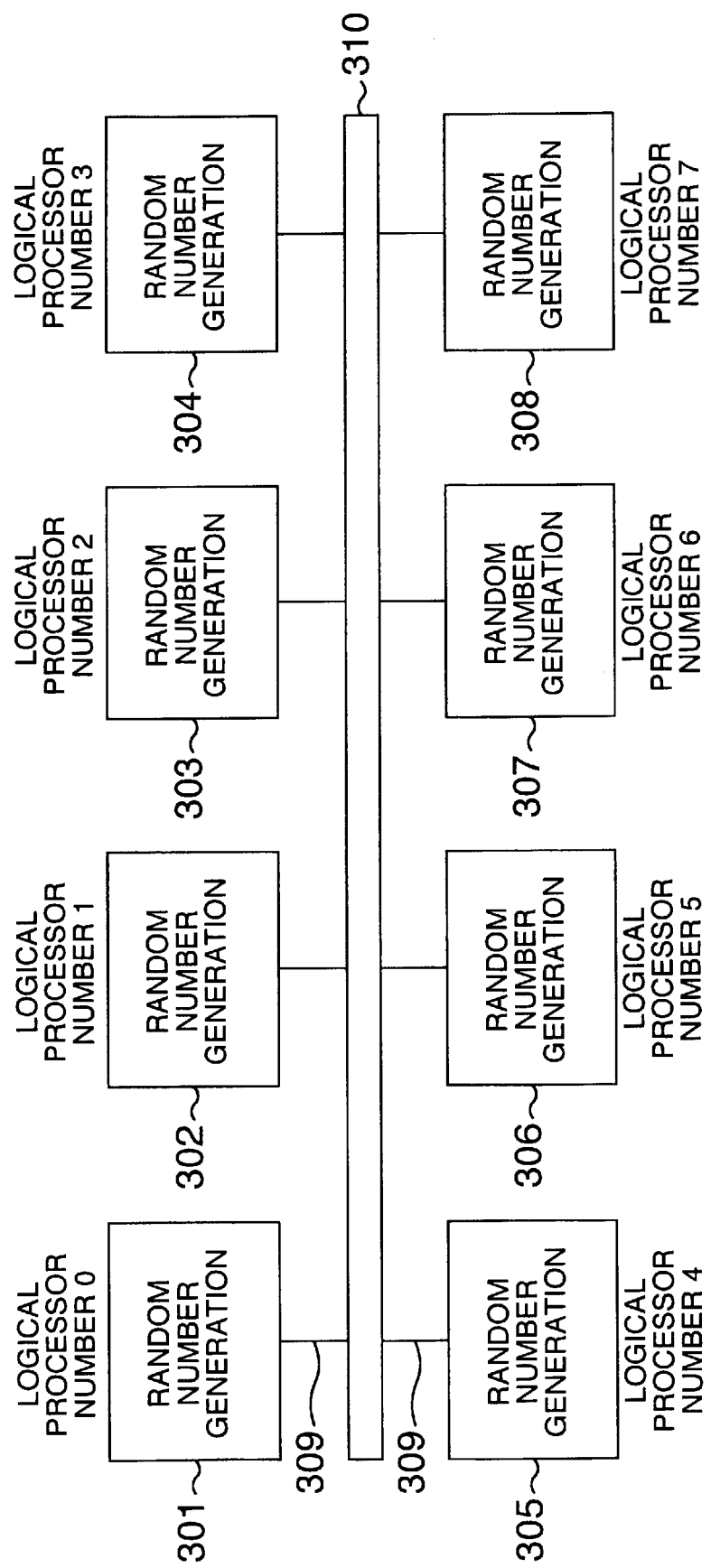
FIG. 3 is a block diagram illustrating a configuration example of a parallel computer to which the random-number generating system according to the embodiment of the present invention is applied.
Figure 4:
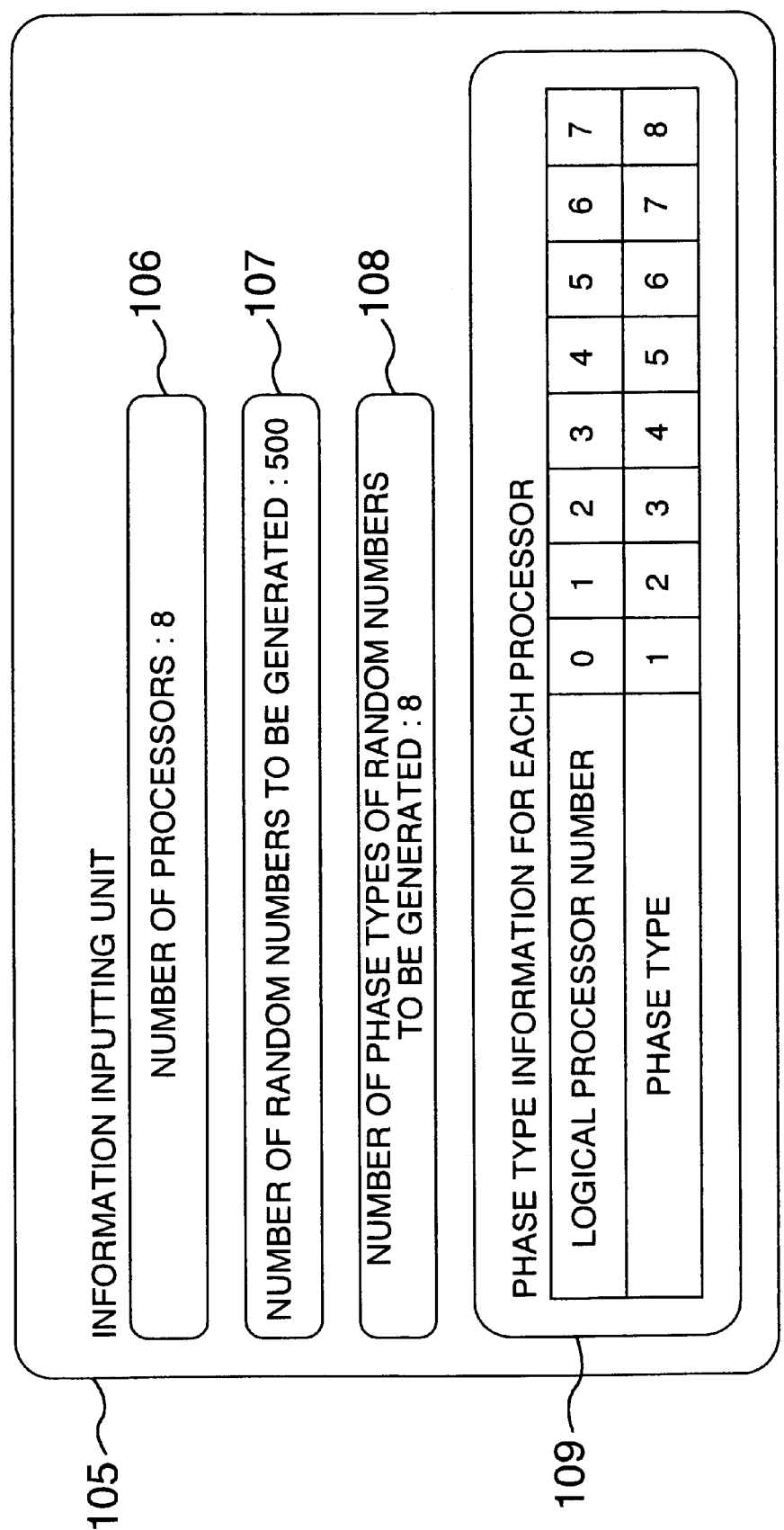
FIG. 4 is a diagram explaining an example of inputted information.

FIG. 1 is a diagram explaining processings in a random-number generating system according to an embodiment of the present invention. FIG. 2 is a diagram explaining processing steps of generating maximum-length linearly recurring sequence random numbers. FIG. 3 is a block diagram illustrating a configuration example of a parallel computer to which the random-number generating system according to the embodiment of the present invention is applied. FIG. 4 is a diagram explaining an example of inputted information. In FIGS. 1 to 4, the reference numerals denote the following components: 101 a random-number generating process unit, 102 a phase-type management-table creating process unit, 103 an initial value table-generating process unit, 104 a random-number generating calculation unit, 105 an information inputting unit, 106 the number of processors, 107 the number of random numbers to be generated, 108 the number of phase types of random numbers to be generated, 109 phase type information for each processor, 110 a phase type management table, 111 an initial value table, 112 an information outputting unit, 113 random numbers, 201 recurrence formulae for generating M sequence random numbers, 202 an initial value table corresponding to 8 kinds of phase types, 203 recurrence formulae for creating the initial value table by congruent multiplication, 204 recurrence formulae for creating the initial value table by utilizing the M sequence random numbers, 205 to 212 initial value tables A to H corresponding to phase types 1 to 8, 213 recurrence formulae for generating the M sequence random numbers corresponding to the 8 kinds of phase types, 301 to 308 processors of logical processor numbers 0 to 7, 309 a network or bus, 310 a network switching switch or memory.

In the random-number generating system according to the embodiment of the present invention illustrated in FIG. 1, from inputted two pieces of information, i.e. the number of phase types of the M sequence random numbers to be generated and information specifying correspondence relation between the logical processor numbers and the phase types of the random numbers to be generated, the phase type management table is created that manages a phase type of the random numbers to be generated by each of the plurality of processors. Then, after the initial value table is created in accordance with the phase types stored in the phase type management table, the random numbers are generated.

The information inputting unit 105 inputs, into the random-number generating process unit 101, the number of processors used in a parallel processing 106, the number of random numbers to be generated by a single processor 107, the number of phase types of random numbers to be generated 108, and the phase type information for each processor 109 specifying which processor generates which phase type of random numbers. The random-number generating process unit 101 includes the phase-type management-table creating process unit 102, the initial value table-generating process unit 103, and the random-number generating calculation unit 104. Here, based on the inputted number of phase types of random numbers to be generated 108 and the inputted phase type information for each processor 109, the phase-type management-table creating process unit 102 creates the phase type management table 110 managing which phase type of random numbers each processor generates. The initial-value table generating process unit 103 creates the initial value table 111 for generating random numbers from the information registered in the phase type management table 110. The random-number generating calculation unit 104 generates random numbers from the generated initial value table in accordance with a generation rule of the M sequence random numbers. The information outputting unit 112 outputs the random numbers 113 that each processor generates.

Incidentally, the random-number generating process unit 101 may be a program stored in storage media such as HD, DAT, FD, and CD-ROM.

Next, referring to FIG. 2, the explanation will be given below concerning the generation rule of the M sequence random numbers and a process of generating the M sequence random numbers corresponding to the 8 kinds of phase types in the random-number generating calculation unit 104.

The M sequence random numbers are generated by the recurrence formulae 201. Notation X in the recurrence formulae 201 means the initial value table. When generating the M sequence random numbers corresponding to the 8 kinds of phase types, the initial value table 202 is used that includes the 8 kinds of initial value tables A 205 to H 212. In an example illustrated in FIG. 2, an initial value that is also usable as a random number corresponding to 521 is stored into each of the 8 kinds of initial value tables A 205 to H 212. Moreover, into each of the 8 kinds of initial value tables A 205 to H 212 within the initial value table 202, the initial value is stored in the order of circled figures in the following steps:

Random numbers generated using the recurrence formulae 203 by the congruent multiplication are stored into the circled FIGS. 1 to 521. Also, employing as the initial value table the random numbers generated by the congruent multiplication 203 and stored into the circled FIGS. 1 to 521, random numbers generated using the recurrence formulae 204 by the M sequence random numbers are stored into the circled FIGS. 522 to 4168. This eventually makes it possible to obtain, within the initial value table 202, the initial value tables A 205 to H 212 corresponding to the phase types 1 to 8. By applying these initial value tables A 205 to H 212 to the recurrence formulae 201 for the M sequence random numbers, it becomes possible to obtain the recurrence formulae 213 for generating the 8 kinds of M sequence random numbers corresponding to the phase types 1 to 8.

The parallel computer, which is illustrated in FIG. 3 and to which the random-number generating system according to the embodiment of the present invention is applied, is constituted by connecting the processors 301 to 308 of logical processor numbers 0 to 7 with the use of the network or bus 309. In FIG. 3, reference numeral 310 denotes the network switching switch if numeral 309 denotes the network, and reference numeral 310 denotes the memory if numeral 309 denotes the bus. In addition, the 8 processors, i.e. the processor 301 of logical processor number 0 to the processor 308 of logical processor number 7, perform the generation of the random numbers according to the embodiment of the present invention.

FIG. 4 shows a concrete example of input information inputted from the information inputting unit 105 explained using FIG. 1. This example is about a case where the parallel computer explained using FIG. 3 is instructed to perform the generation of the random numbers according to the embodiment of the present invention. The conditions specified therein are as follows: The number of the processors used in the parallel processing 106 is 8, the number of the random numbers to be generated by each processor 107 is 500, and the number of the phase types of the random numbers to be generated 108 is 8. Also, the phase type information for each processor 109 specifies a condition that the respective processors of logical processor numbers 0 to 7 generate the random numbers corresponding to the respective phase types 1 to 8.

Next, the explanation will be given below concerning processing operation of generation of the random numbers performed by any one logical processor included in the parallel computer.

Figure 5:
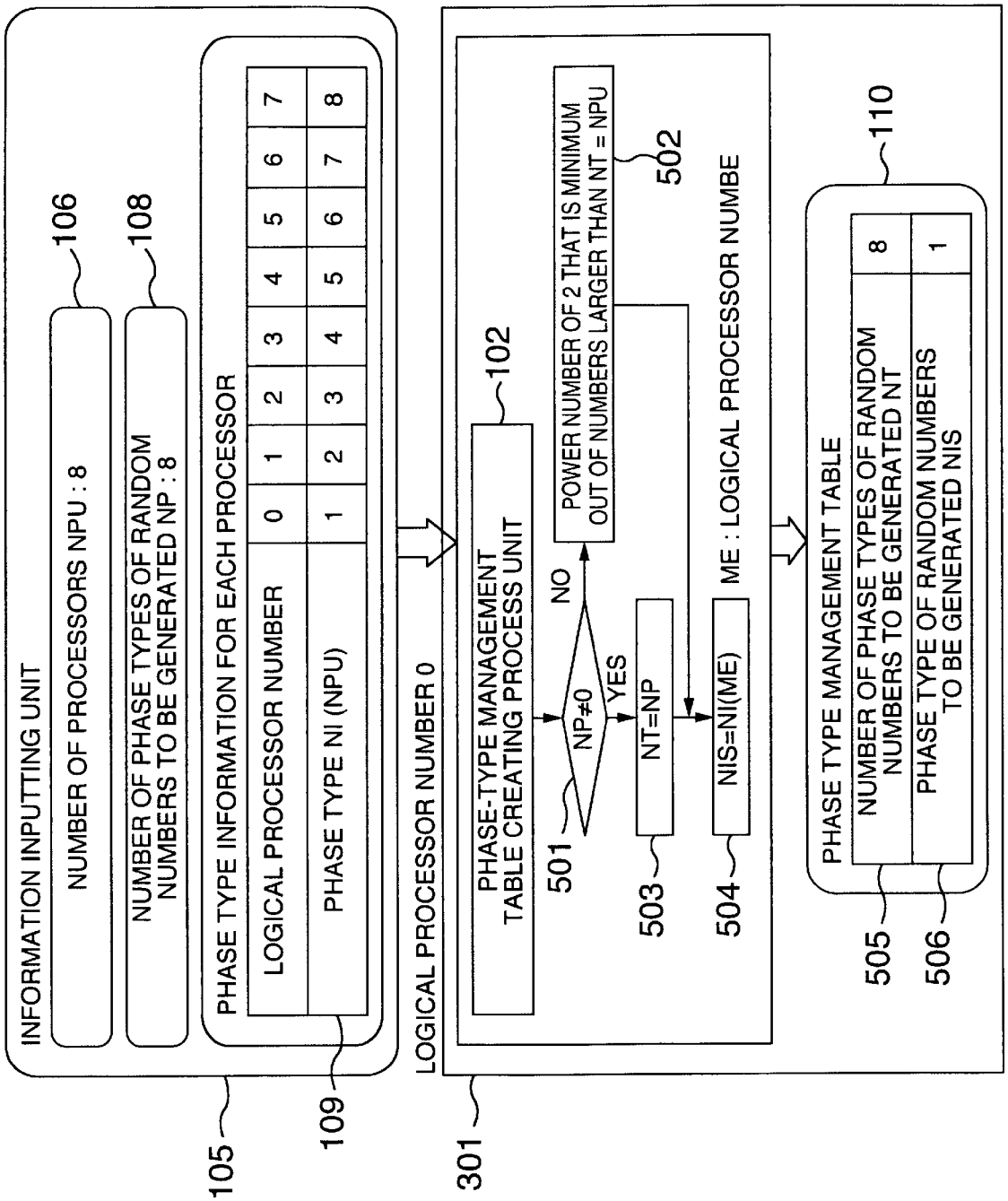
FIG. 5 is a diagram explaining processes in a phase-type management-table creating process unit 102 on a processor 301 of logical processor number 0.
Figure 6:
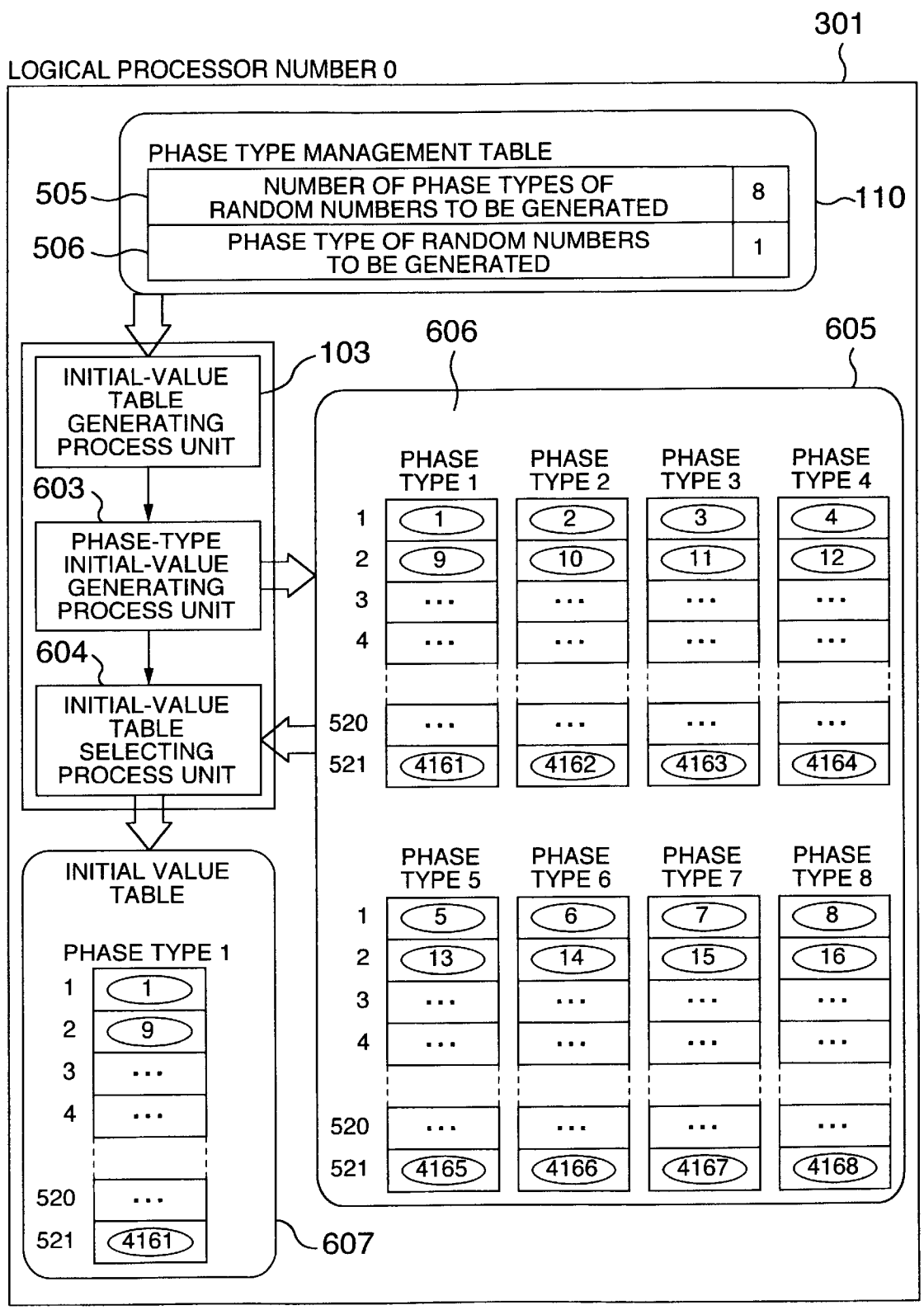
FIG. 6 is a diagram explaining processes in an initial-value table generating process unit 103 on the processor 301 of logical processor number 0.
Figure 7:
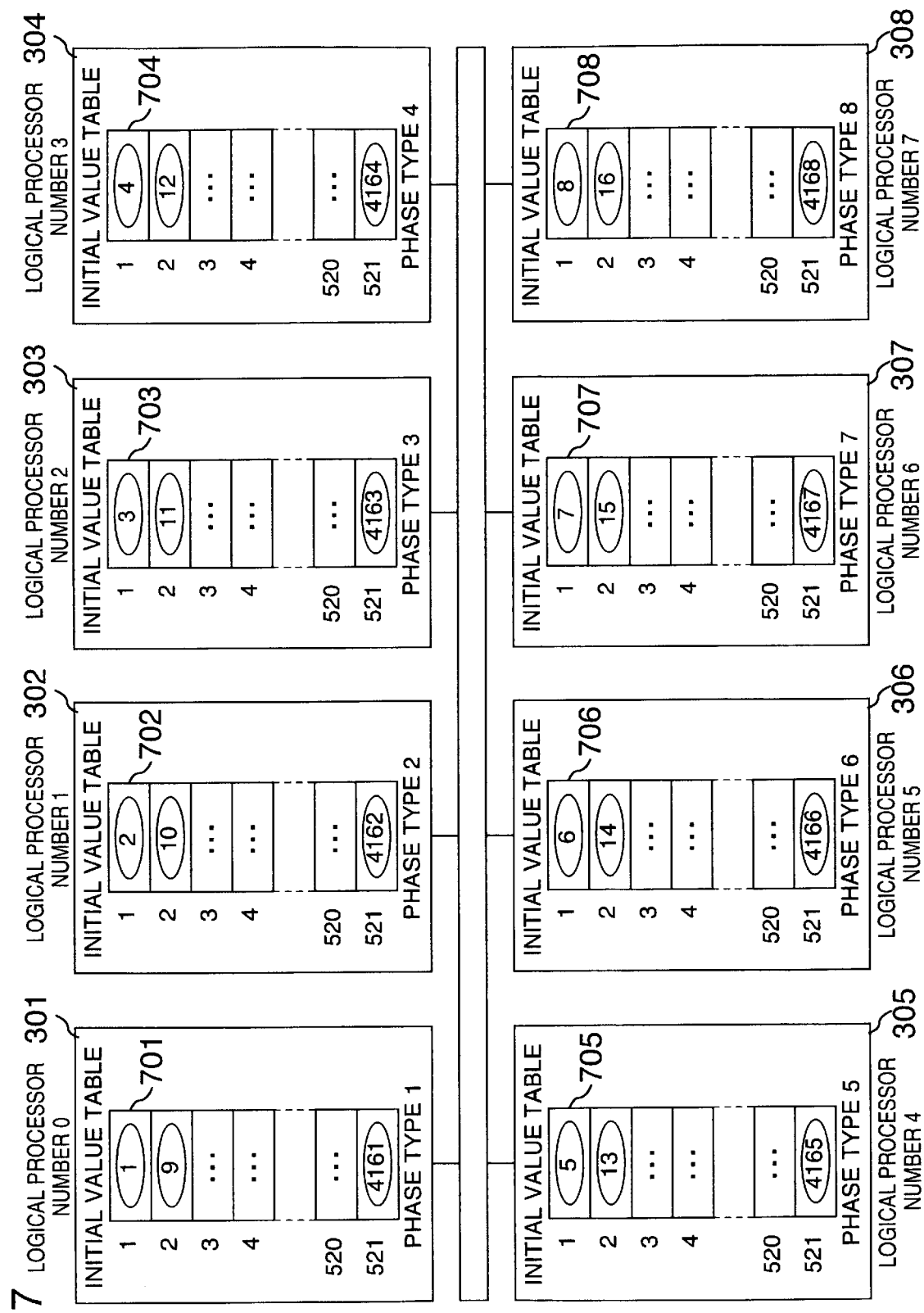
FIG. 7 is a diagram illustrating initial value tables generated by the initial-value table generating process unit 103 on each processor.

FIG. 5 is a diagram explaining processes in the phase-type management-table creating process unit 102 on the processor 301 of logical processor number 0. FIG. 6 is a diagram explaining processes in the initial-value table generating process unit 103 on the processor 301 of logical processor number 0. FIG. 7 is a diagram illustrating the initial value tables generated by the initial-value table generating process unit 103 on each processor.

As shown in FIG. 5, as the input information from the information inputting unit 105, the processor 301 of logical processor number 0 receives the following information: The number of the processors 106, i.e. NPU, is 8, and the number of the phase types of the random numbers to be generated 108, i.e. NP, is 8. Also, the phase type information for each processor 109 specifies that the respective processors of logical processor numbers 0 to 7 generate the random numbers corresponding to the respective phase types 1 to 8.

First, at a step 501, the phase-type management-table creating process unit 102 in the processor 301 checks whether or not NP, i.e. the number of the phase types of the random numbers to be generated that is specified by the input information, is equal to 0. Then, the phase-type management-table creating process unit determines NT 505, i.e. the number of the phase types of the random numbers to be generated that is to be stored into the phase type management table 110. Namely, if NP, i.e. the number of the phase types of the random numbers to be generated that is included in the input information, is not equal to 0, at a step 503, the phase-type management-table creating process unit, not changing the value of NP 108, i.e. the number of the phase types of the random numbers to be generated, stores the value itself into NT 505, i.e. the number of the phase types of the random numbers to be generated that is included in the phase type management table 110.

Meanwhile, if NP, i.e. the number of the phase types of the random numbers to be generated that is included in the inputted information, is equal to 0, it means the following: NP, i.e. the number of the phase types, has not been specified yet and the decision will be left to the processor 301. Accordingly, at a step 502, the processor 301 determines a power number 502, i.e. a power number of 2 that is a minimum out of numbers larger than NPU, i.e. the number of the processors that is included in the input information. Then, the processor stores the value of the power number into NT 505, i.e. the number of the phase types of the random numbers to be generated that is included in the phase type management table 110.

Next, at a step 504, the processor 301 stores, into NIS 506, a phase type corresponding to the logical processor number of the processor in the phase type information for each processor 109. Here, reference numeral NIS 506 denotes a phase type of the random numbers to be generated that is stored in the phase type management table 110. Additionally, reference notation ME denotes the logical processor number of the processor.

The above-described processing allows the processor 301 of the logical processor number 0 to obtain a table storing the following information as the phase type management table 110 that the processor has: NT 505, i.e. the number of the phase types of the random numbers to be generated, is the 8 kinds, and NIS 506, i.e. a phase type of the random numbers that the processor generates, is 1 out of the 8 kinds of phase types.

Next, referring to FIG. 6, the explanation will be given below concerning processing operation performed by the processor 301 of the logical processor number 0 in the initial-value table generating process unit 103.

From the information that NT 505, i.e. the number of the phase types of the random numbers to be generated in the phase type management table 110 that the phase-type management-table creating process unit 102 has created by the above-described processing, is the 8 kinds, the initial-value table generating process unit 103 in the processor 301 of the logical processor number 0 causes a phase-type initial-value generating process unit 603 to generate an initial value table 605 corresponding to the 8 kinds of phase types in accordance with the generation rule of the M sequence random numbers. This generation of the initial value table 605 is performed in much the same way as explained in FIG. 2. Also, circled figures within the initial value table represent an order of determining initial values in the case where the initial value table 605 corresponding to the 8 kinds of phase types is created in accordance with the generation rule of the M sequence random numbers illustrated in FIG. 2. The initial value table in this example turns out to be identical to the initial value table 202 illustrated in FIG. 2.

From the information that NIS 506, i.e. a phase type of the random numbers to be generated that is stored in the phase type management table 110, is 1, an initial-value table selecting process unit 604 selects an initial value table 606 corresponding to the phase type 1 out of the initial value table 605 corresponding to the 8 kinds of phase types, then outputting the initial value table 606 as an initial value table 607 to be used by the processor of the logical processor number 0.

In the above-described explanation, the processing has been given in which the processor 301 of the logical processor number 0 generates the initial value tables corresponding to the respective phase types, then outputting the initial value table of the phase type that the processor requires. Each of the other processors constituting the parallel computer performs the same processing as that described above, thereby outputting an initial value table of a phase type that the processor requires.

FIG. 7 illustrates a state where each of the processors in the parallel computer configured as illustrated in FIG. 3 has generated an initial value table with the use of the initial-value table generating process unit 103 within the processor. Namely, the respective processors 301 to 308 of the logical processor numbers 0 to 7 have generated the respective initial value tables 701 to 708 each corresponding to the phase types 1 to 8, and then hold these initial value tables. Each of the processors is capable of using data stored in its own initial value table as the random numbers in the order from the upper column of the table. Also, the random-number generating calculation unit 104 makes it possible to independently generate even larger number of the random numbers in accordance with the generation rule of the M sequence random numbers explained using FIG. 2.

Next, using the accompanying drawings, the explanation will be given below concerning a processing of exchanging generated random numbers between the processors, assuming that the random numbers generated by the processor of the logical processor number 0 are exchanged with the random numbers generated by a processor of logical processor number 7.

Figure 8:
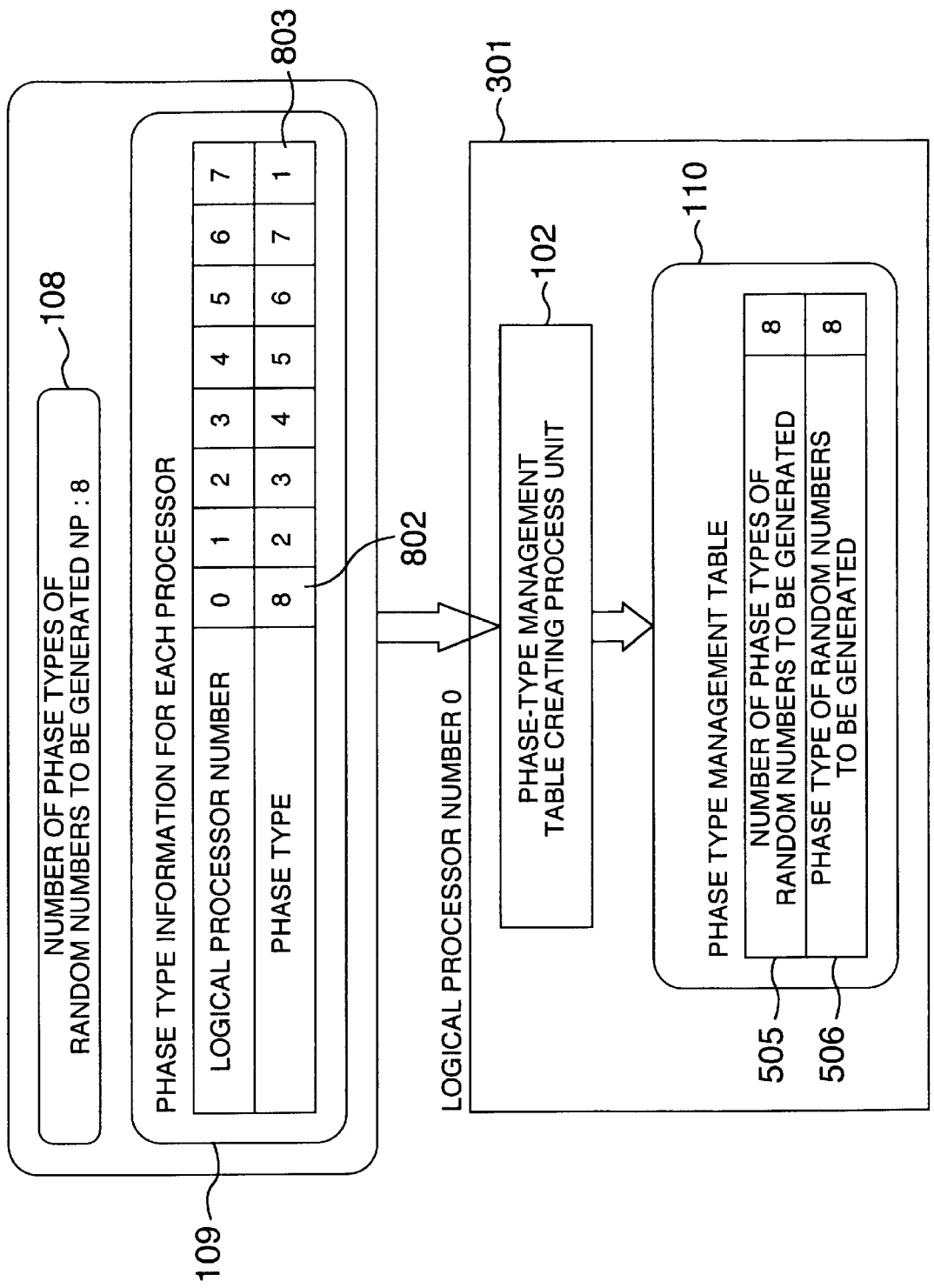
FIG. 8 is a diagram explaining processes in a phase-type management-table creating process unit on a processor of logical processor number 0.
Figure 9:
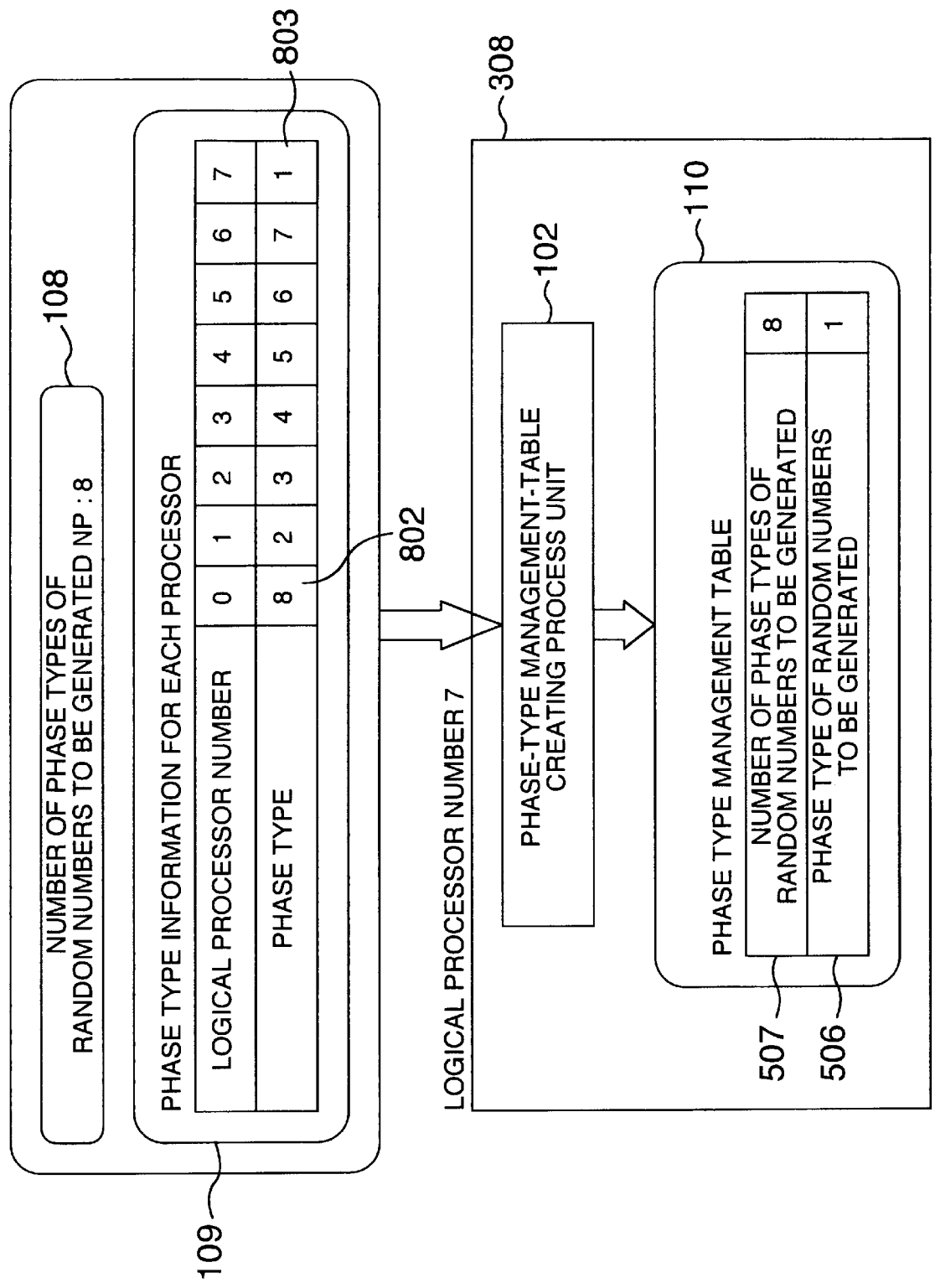
FIG. 9 is a diagram explaining processes in a phase-type management-table creating process unit on a processor of logical processor number 7.
Figure 10:
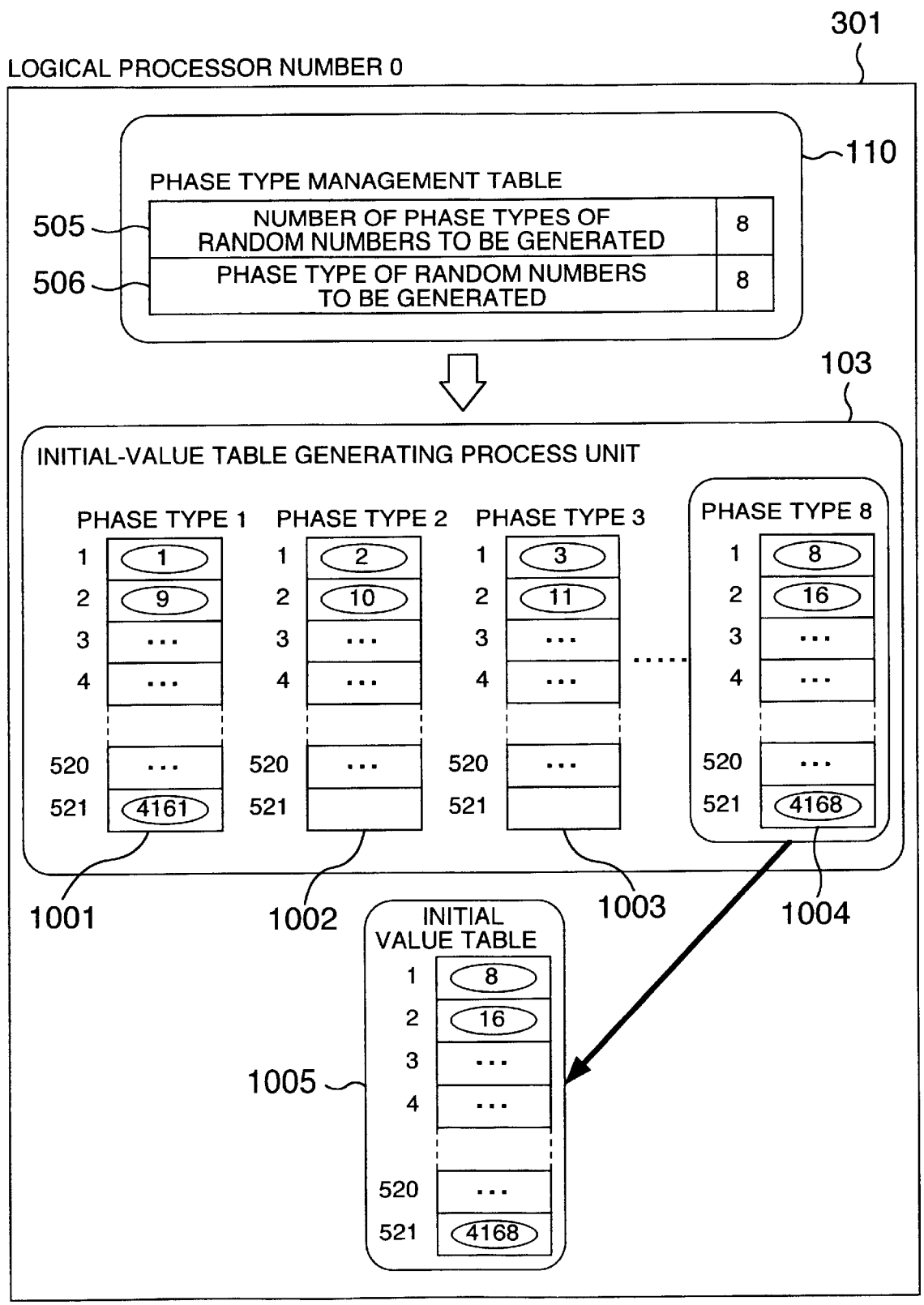
FIG. 10 is a diagram explaining processes in an initial-value table generating process unit on a processor of logical processor number 0.
Figure 11:
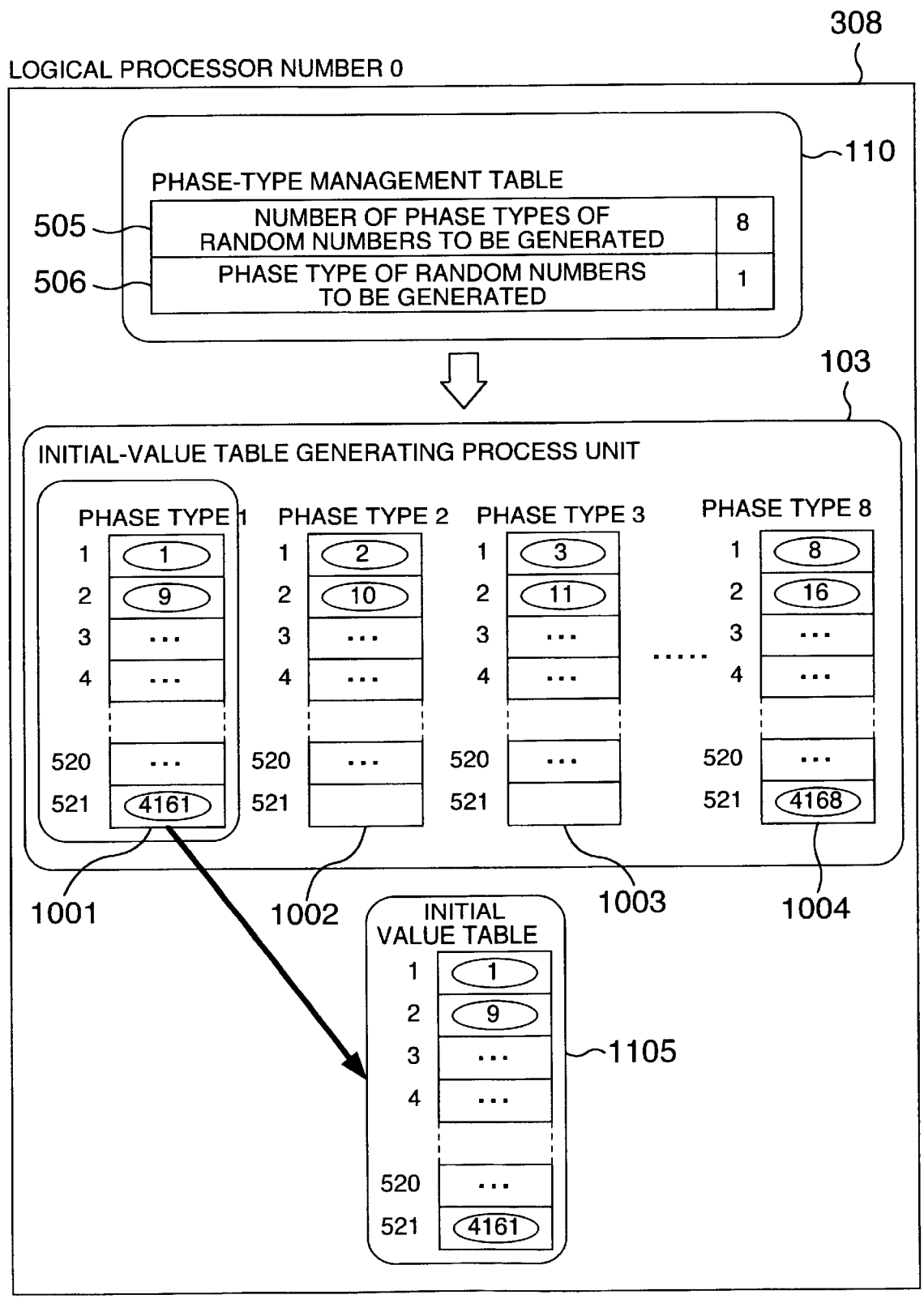
FIG. 11 is a diagram explaining processes in an initial-value table generating process unit on a processor of logical processor number 7.

FIG. 8 is a diagram explaining processes in the phase-type management-table creating process unit on the processor of the logical processor number 0. FIG. 9 is a diagram explaining processes in a phase-type management-table creating process unit on the processor of the logical processor number 7. FIG. 10 is a diagram explaining processes in the initial-value table generating process unit on the processor of the logical processor number 0. FIG. 11 is a diagram explaining processes in an initial-value table generating process unit on the processor of the logical processor number 7.

The phase type information for each processor 109 explained using FIG. 2 has specified the condition that the processor of the logical processor number 0 generates the random numbers corresponding to the phase type 1, and the processor of the logical processor number 7 generates the random numbers corresponding to the phase type 8. However, when the random numbers generated by the processor of the logical processor number 0 are exchanged with the random numbers generated by the processor of logical processor number 7, as illustrated in FIG. 8, a phase type 802 that corresponds to the logical processor number 0 in the phase type information for each processor 109 is specified to 8 and a phase type 803 that corresponds to the logical processor number 7 is specified to 1.

Using the above-mentioned phase type information for each processor 109, the phase-type management-table creating process unit 102 performs the same processing as that explained using FIG. 5. As a result of this processing, the processor 301 of the logical processor number 0 creates a phase type management table 110 illustrated in FIG. 8 and used by the processor, in which NT 505, i.e. the number of the phase types of the random numbers to be generated, is specified to 8 and NIS 506, i.e. a phase type of the random numbers to be generated, is specified to 8.

Being provided with phase type information for each processor 109 that, as illustrated in FIG. 9, has the same content as that of the phase type information for each processor 109 provided in FIG. 8, the phase-type management-table creating process unit 102 performs the same processing as that explained using FIG. 5. As a result of this processing, the processor 308 of the logical processor number 7 creates a phase type management table 110 illustrated in FIG. 9 and used by the processor, in which NT 505, i.e. the number of the phase types of the random numbers to be generated, is specified to 8 and NIS 506, i.e. a phase type of the random numbers to be generated, is specified to 1.

As illustrated in FIG. 10, the following processings are executed, using the phase type management table 110 created by the processing explained in FIG. 8 and used by the processor 301 of the logical processor number 0: First, since NT 505, i.e. the number of the phase types of the random numbers to be generated, is specified to 8 kinds, the initial value table-generating process unit 103 generates initial value tables 1001 to 1004 corresponding to the 8 kinds of phase types. Then, since NIS 506, i.e. a phase type of the random numbers that the processor generates, is specified to 8, the processor 301 of the logical processor number 0 outputs the initial value table 1004 as an initial value table 1005 to be used by the processor.

Meanwhile, as illustrated in FIG. 11, the following processings are executed, using the phase type management table 110 created by the processing explained in FIG. 9 and used by the processor 308 of the logical processor number 7: First, since NT 505, i.e. the number of the phase types of the random numbers to be generated, is specified to 8 kinds, the initial value table-generating process unit 103 generates initial value tables 1001 to 1004 corresponding to the 8 kinds of phase types. Then, since NIS 506, i.e. a phase type of the random numbers that the processor generates, is specified to 1, the processor 308 of the logical processor number 7 outputs the initial value table 1001 as an initial value table 1105 to be used by the processor.

In the embodiments explained using FIGS. 8 to 11, the correspondence between the logical processor number and the number of the phase type is changed within the inputted phase type information for each processor, thereby causing the processor 308 of the logical processor number 7 to generate the random numbers corresponding to the phase type generated by the processor 301 of the logical processor number 0, and, conversely, causing the processor 301 of the logical processor number 0 to generate the random numbers corresponding to the phase type generated by the processor 308 of the logical processor number 7. What is more, in the present invention, it is possible to cause an arbitrary processor to generate random numbers corresponding to an arbitrary phase type just by changing the correspondence between the logical processor number and the number of the phase type within the inputted phase type information for each processor.

Figure 12:
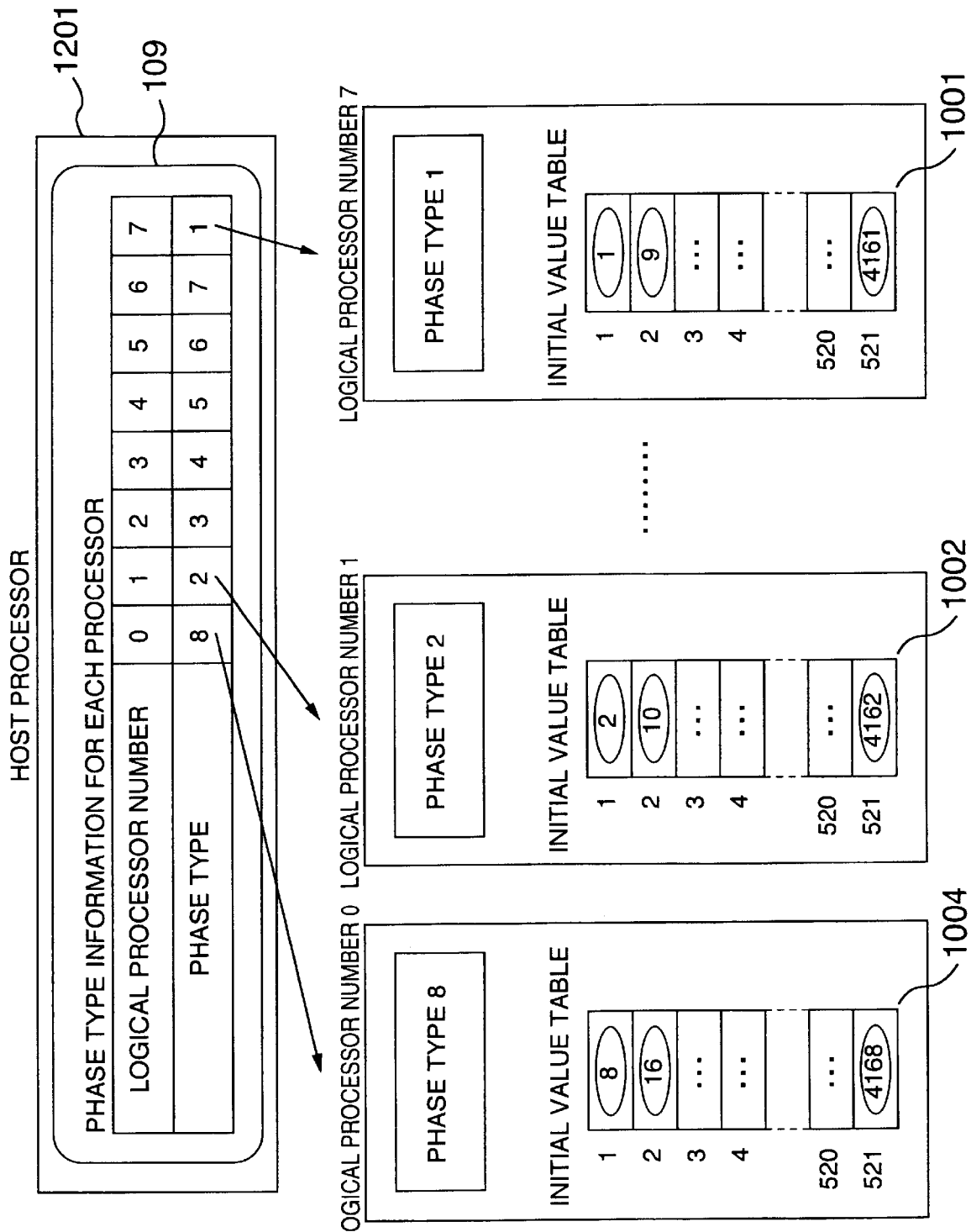
FIG. 12 is a diagram explaining processes in a phase-type management-table creating process unit and an initial-value table generating process unit in another embodiment.

The above-described embodiments have been configured in such a manner that each of the processors creates the phase type management table and the initial value tables, then generating the random numbers. It is needless to say, however, that the present invention is not limited to the above-described embodiments but can be configured in such a manner as to separate the function of creating the phase type management table, the function of creating the initial value tables, and the function of performing the generation of the random numbers. For example, FIG. 12 is a diagram for creating initial value tables corresponding to a system including 1 unit of host processor 1201 and 8 units of processors. The host processor 1201 includes phase type information for each processor 109, and distributes to the respective processors the phase types corresponding to the logical processor numbers, respectively. The respective processors create the initial value tables 1001, 1002, and 1004 each corresponding to the distributed logical processor numbers in accordance with the generation rule of the M sequence random numbers illustrated in FIG. 2. Concerning the processings thereinafter, as indicated in FIG. 7, each of the processors generates the random numbers.

As described above, according to the present invention, when each of the processors on a parallel computer generates the M sequence random numbers having a different phase type, the relation among the number of the phase types, the processors and the phase type is arbitrarily specified, thereby making it possible to cause each of the processors to execute the generation of the random numbers.

Concerning the generation of the random numbers on the parallel computer, in addition to the importance of speeding-up of the generation processing, it is also important to exchange the random numbers to be generated between the processors in order to verify the validity of a numerical simulation result using the generated random numbers. The present invention makes it possible to exchange the random numbers to be generated between arbitrary processors.

What is claimed is:

1. A random-number generating method in which a parallel computer including a plurality of processors is used so as to generate random numbers having a plurality of phase types, comprising the steps of:

managing, by a processor, processors for generating random numbers and phase types in a manner that they have correspondence relationships therebetween, said phase types being used for generating the random numbers by said processors for generating random numbers, and generating, by each of said processors for generating random numbers, random numbers of a phase type corresponding thereto.

2. The random-number generating method as claimed in claim 1, wherein:

a first processor manages second and third processors and phase types in a manner that they have correspondence relationships therebetween, said phase types being used for generating random numbers by said second and third processors, respectively, and said second and third processors generate random numbers of said phase types corresponding to said second and third processors, respectively.

3. A random-number generating method in which a parallel computer including a plurality of processors is used so as to generate random numbers having a plurality of phase types, comprising the steps of:

inputting information about the number of phase types of random numbers to be generated and information specifying which phase type of random numbers each of said processors generates, and generating, by each of said processors, random numbers of a phase type specified out of the phase types provided as many as said number.

4. The random-number generating method as claimed in claim 3, comprising the steps of:

receiving the inputted information, creating a management table that manages said processors and phase types of random numbers to be generated in a manner that they have correspondence relationships, therebetween, and generating, by each of said processors, random numbers of the phase type specified based on said management table.

5. The random-number generating method as claimed in claim 4, comprising the steps of:
receiving, by a first processor, the inputted information, creating the management table, and
generating, by a second processor, random numbers of the phase type specified based on said management table created.

6. The random-number generating method as claimed in claim 4, wherein said management table manages said plurality of processors in a manner that said processors are in correspondence with phase types of the random numbers that are different from each other.

7. The random-number generating method as claimed in claim 4, comprising the steps executed by each of said processors':
creating initial value tables as many as the number of said phase types,
selecting, out of said initial value tables thus created, an initial value table to generate random numbers of a phase type specified based on said management table, and
generating random numbers of a phase type specified based on said initial value table thus selected.

8. The random-number generating method as claimed in claim 7, wherein each of said processors generates, at a plurality of times, random numbers of a single phase type specified based on said initial value table selected.

9. The random-number generating method as claimed in claim 4, wherein the correspondence relationships managed by said management table between said processors and said phase types of the random numbers to be generated are changed, thereby, between said processors, exchanging respective phase types of the random numbers to be generated.

10. A random-number generating method in which a parallel computer including a plurality of processors is used so as to generate random numbers having a plurality of phase types, comprising the steps of:
inputting information about the number of said processors to be used and information specifying which phase type of random numbers each of said processors generates, and
determining, by each of said processors, the number of phase types of the random numbers to be generated from the number of said processors to be used, and
generating, by each of said processors, random numbers of a phase type specified out of the phase types provided as many as said number.

11. A random-number generating apparatus comprising a plurality of processors and generating random numbers having a plurality of phase types, wherein said processors include a management unit and a random-number calculating unit, said management unit managing said processors and phase types of the random numbers to be generated in a manner that they have correspondence relationships therebetween, and said random-number calculating unit receiving information from said management unit so as to calculate random numbers of a phase type being in correspondence with a processor.

12. The random-number generating apparatus as claimed in claim 11, wherein a first processor includes said management unit and a second processor includes said random-number calculating unit.

13. The random-number generating apparatus as claimed in claim 11, including a changing unit of changing correspondence relationship between said processors and said phase types of the random numbers to be generated.

14. The random-number generating apparatus as claimed in claim 11, wherein said management unit manages said plurality of processors in a manner that said processors are in correspondence with phase types of the random numbers that are different from each other.

15. A storage medium storing a random-number generating method in which a parallel computer including a plurality of processors is used so as to generate random numbers having a plurality of phase types, wherein said random-number generating method includes the following steps of:
inputting information about the number of phase types of the random numbers to be generated and information specifying which phase type of random numbers each of said processors generates, and
generating, by each of said processors, random numbers of a phase type specified out of the phase types provided as many as said the number.

* * * * *